Sept. 19, 1967 — W. F. CURRAN — 3,342,125
APPARATUS FOR REVERSING A WORKPIECE FOR AN AUTOMATIC PRESS LINE
Filed Aug. 2, 1965 — 6 Sheets-Sheet 1

Fig. 1

INVENTOR
Willard F. Curran
by Wolfe, Hubbard,
Voit & Osann
ATTORNEYS

Sept. 19, 1967 W. F. CURRAN 3,342,125
APPARATUS FOR REVERSING A WORKPIECE FOR AN AUTOMATIC PRESS LINE
Filed Aug. 2, 1965 6 Sheets-Sheet 4

INVENTOR
Willard F. Curran
by: Wolfe, Hubbard, Voit & Osann
ATTORNEY

United States Patent Office 3,342,125
Patented Sept. 19, 1967

3,342,125
APPARATUS FOR REVERSING A WORKPIECE FOR AN AUTOMATIC PRESS LINE
Willard F. Curran, Chicago, Ill., assignor to Danly Machine Specialties, Inc., Chicago, Ill., a corporation of Illinois
Filed Aug. 2, 1965, Ser. No. 476,535
9 Claims. (Cl. 100—207)

ABSTRACT OF THE DISCLOSURE

Apparatus for inversely orienting workpieces synchronized with the operation of a series of power presses and associated conveyers and transfer mechanisms for automatically performing a number of press operations on the workpieces and in which turnover wheels are integrated with an intermittently advancing conveyer having fixtures spaced thereon as a function of the distance of advance. The turnover wheels include arms which are a function of advance of the conveyer fixtures and provision is made for removing, inverting and depositing workpieces during dwell periods of the conveyer fixture at points of pick-up and return, respectively, along the path of the conveyer.

---

The present invention relates to power presses and more particularly to methods and apparatus for inverse orienting of a workpiece synchronized with the operation of a series of presses and associated transfer mechanisms for automatically performing a series of press operations on the workpiece. In its principal aspect, the invention is concerned with improved methods and apparatus for inverting orientation of a workpiece in performance of successive operations along a series of power presses, yet wherein the inversion occurs synchronized with the presses and press transfer equipment for continuous operation.

A power press line of the type that may be advantageously utilized with the methods and apparatus of the present invention is described and claimed in the copending application of James C. Danly, Ser. No. 354,954, filed Mar. 26, 1964, now U.S. Patent No. 3,199,443 and assigned to the assignee of the present invention. Thus, there is disclosed and claimed in the aforesaid Danly application a press line having provision for synchronizing all of the press line functions, including an automatic transfer mechanism for transport of the workpiece down the line, permitting the press to run in the "continuous" mode at high speed. Such application further discloses a press line in which a series of power presses are provided with conveyors extending from one to the next with each press having a transfer mechanism for loading a workpiece from the input side of the conveyor into the press work area and a second transfer mechanism for loading the workpiece from the work area to the conveyor at the output side in which the transfer devices and adjacent conveyor are kept in synchronization with the press slide by a positive and direct mechanical coupling with adjacent presses synchronized by a control circuitry described and claimed in James C. Danly application, Ser. No. 413,547, filed Nov. 24, 1964, now U.S. Patent 3,199,439. Since the workpieces upon which the press operations are to be performed often include punched-out areas, which may be on inclined planes, or contoured surfaces, some of the press operations may be more advantageously performed on opposite sides of the workpiece.

Accordingly, it is an object of the present invention to provide improved methods and apparatus for inverting workpieces synchronized with the press line functions, permitting the press to run in the "continuous" mode at high speed. While not so limited in its application, the invention will find especially advantageous use where press operations are to be performed on a workpiece such as an automobile instrument panel, wherein some operations are to be performed with the workpiece positioned "upright" in the press work area, and in other instances in an "inverted" position in the press work area.

It is an object in one of its important aspects to provide a novel turnover apparatus integrated with a power press line and synchronized with the press line conveyors for removing a workpiece from a conveyor fixture during dwell of the conveyor at the point of pickup and drop off of the inverted workpiece in another fixture during dwell of the conveyor at the point of return to insure proper positioning of the workpiece in the conveyor fixture.

It is a more specific object to provide a turnover apparatus for removing a workpiece from a conveyor fixture during dwell of the conveyor at the point of pickup and drop off of the inverted workpiece in the fixture from which it was removed during dwell of the conveyor at the point of return. In this connection, it is an object to provide a turnover device for removing the workpiece from a conveyor fixture during dwell of the conveyor, shifting the turnover device to a storage position so that it is clear of the conveyor, advancing a conveyor fixture into a receiving position and depositing the workpiece in the fixture from which it was taken but in an inverted position.

It is an object to provide a press line having conveyors extending between the adjacent presses which are indexed forwardly for uniform increments of advance and dwell successively and wherein a turnover mechanism is positioned between adjacent work stations and indexed for removing a workpiece during dwell of the conveyor and depositing the workpiece in an inverted position at the next succeeding dwell cycle of the conveyor. In this connection, it is an object to provide a turnover mechanism having plural increments of advance equal to a single increment of advance of the conveyor for moving a workpiece in an out-of-the-way position during repositioning of the conveyor to receive the inverted workpiece.

It is an object of the invention in one of its aspects to provide a mechanized press line having a novel conveyor and turnover arrangement permitting opposite sides of a workpiece to be acted upon without necessity for attaching a new set of fixtures or carriers to accommodate a repositioned workpiece. In this connection, it is an object to provide a simple, reliable turnover arrangement which is particularly suitable for use in mass production manufacturing operations.

Other objects and advantages of the invention will become apparent upon reading the attached detailed description and upon reference to the drawings, in which.

While the invention is susceptible of various modifications and alternative forms, illustrative embodiments thereof have been shown by way of example in the drawings and will herein be described in detail. It should be understood, however, that it is not intended to limit the invention to the particular forms disclosed but, on the contrary, the intention is to cover all modification, equivalents and alternatives falling within the spirit and scope of the invention as expressed in the appended claims.

Figure 1:
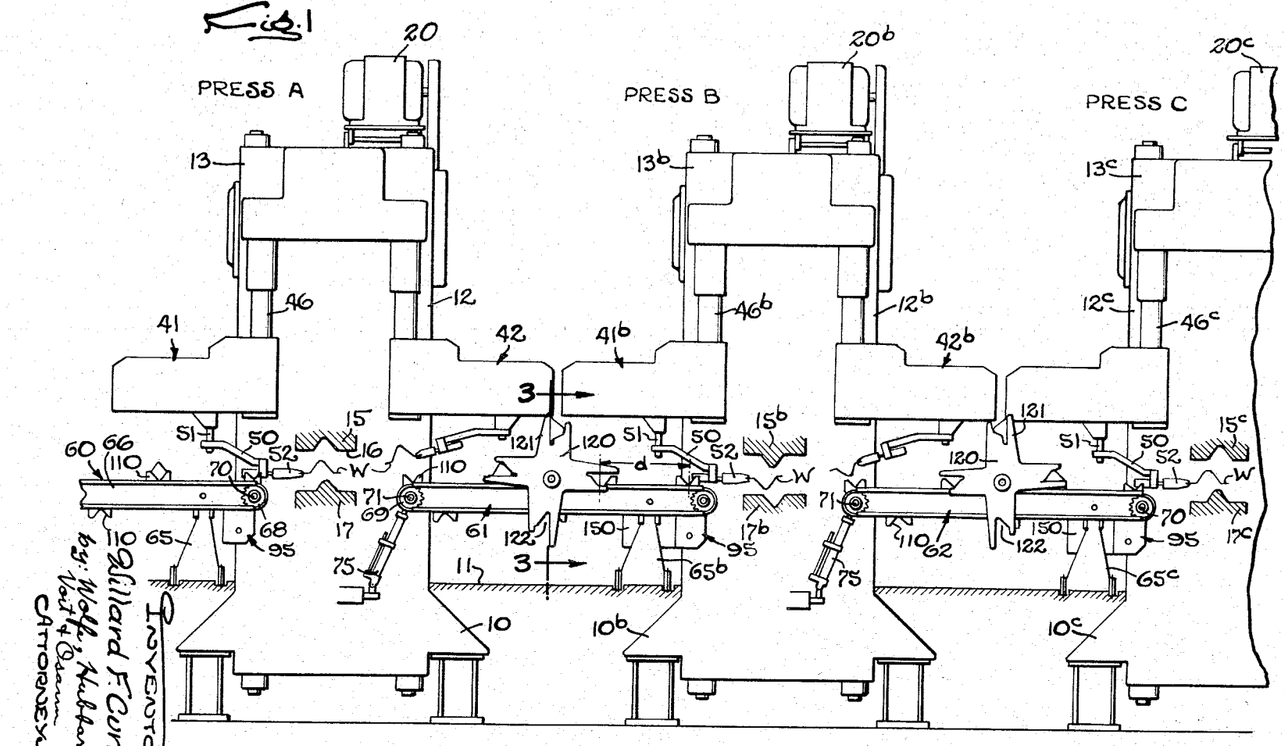
FIGURE 1 is a side elevation, partly diagrammatic, showing a press line incorporating the present invention.

Referring now to the drawings, and particularly to FIG. 1, there is illustrated a portion of an automated press line intended for performing successive operations upon a workpiece W, for example, an automotive instrument panel. For purposes of illustration, only three presses have been shown, indicated by press A, press B and press C, together with their associated transfer and conveyor mechanisms, and it will be understood that the press line may in practice be extended to include any number of similar units in accordance with the present teachings. As here shown, press A, by way of example, includes a massive base 10 extending below the floor 11 and an upwardly extending frame 12 is topped by a crown 13. Reciprocatingly mounted in the press frame is a slide diagrammatically indicated at 15 with cooperating upper and lower dies 16, 17, driven by a press driving motor 20.

While knowledge of only the main elements of a power press will suffice for a full understanding of the present invention, cross reference may be made to the trade literature and descriptive brochures of press manufacturers for the details of a commercial or practical press. Thus, briefly referring to the press driving elements, and referencing FIG. 4 which is a diagrammatic perspective view of the drive mechanism, there is shown an input shaft 21 coupled to an input pinion 22 which are driven by the motor 20. A suitable step down drive connection and clutch, the energization of which is controlled through appropriate and interlocked circuitry, are not shown; however, cross reference is made to the aforesaid copending application for details thereof. The pinion 22 drives a pair of intermediate gears 25, 26 which mesh with the main press drive gears 29, 30, respectively. In a conventional press such gears are connected to the press pitman and the movement and phasing of the slide are under the joint control of timing cams and operating pushbuttons which, through appropriate and interlocked circuitry, control the energization of the clutch (not shown) through which the motor 20 drives shaft 21. The control circuitry generally includes operation in the "continuous" mode and for safety purposes it is desirable to have the press controllable in the "inch" and "run" modes in addition to the "continuous" mode. Circuitry permitting operation of all three modes is disclosed in copending United States application Ser. 169,527, filed January 29, 1962, now U.S. Patent No. 3,227,255 and assigned to the assignee of the present invention. In the enusing discussion the subsequent presses B and C in the line are shown with corresponding reference numerals with the addition of subscripts "b" and "c", respectively, to represent corresponding parts.

Each of the presses is equipped with loading and unloading transfer mechanisms, the first for moving workpieces into the working area from the input side and the second for moving workpieces out of the working area at the output side. Taking press A, by way of example, the first or loading transfer mechanism is indicated at 41, and the second or unloading transfer mechanism is indicated at 42, as viewed in FIG. 1. The two transfer mechanisms are substantial duplicates of one another, differing only in the programmed movement. Thus, primary reference will be made to the mechanisms of 41 at the input. The mechanism includes a supporting frame 45 in the form of a bracket which extends, cantilever fashion, from the input side of the press, and being supported from a vertically depending post 46 which, in turn, is anchored to the crown 13 of the press. Extending in folded back relation under the bracket 45 is a transfer arm 50 mounted on a post 51 and having a gripper 52 for gripping a workpiece W and for depositing it on the lower die 17. For the details of the mechanism for transporting the arm 50 for vertical and horizontal movement, and the grippers reference is made to the aforesaid copending United States application Ser. No. 354,954, filed March 26, 1964, now U.S. Patent No. 3,227,255.

Conveyors are provided leading to the first press and bridged between the presses for conveying the workpieces and for positioning the workpieces for convenient and accurate gripping by the transfer arms of the adjacent transfer mechanisms. Thus, there is provided an input conveyor 60 and successive conveyors 61, 62, which are substantial duplicates of one another. At the end of the conveyor, adjacent the press A, a supporting base structure 65 is provided, supporting a conveyor frame 66 which normally extends horizontally, as shown. Journaled at the ends of the frame 66 are a first set of conveyor sprockets 68 and a second pair of conveyor sprockets 69 are secured to axles 70, 71, respectively. Trained about the sprocket wheels on each side of the conveyor are sprocket chains 72, 73. The overhanging end of the conveyor frame is supported by a supporting post 75.

The transfer mechanisms at the input and output sides of a given press, and at least one of the associated conveyors are directly coupled to the press drive for movement which is precisely coordinated with the movement of the press slide. Moreover, means are provided for substantially synchronizing the phase position of the output of the respective press drives, and the conveyors are each provided with an intermittent drive coupling to establish a dwell period at the points of loading and unloading of the workpieces, thereby to insure proper engagement and disengagement of the workpiece notwithstanding any minor variations in synchronism which may exist between the output of the drives of the adjacent presses. For details of the means for establishing synchronism in the phase position of the outputs of the press drives, reference is made to the aforesaid copending applications.

For the moment, attention will be focused upon an exemplary mechanism for effecting a coordinated driving of a transfer mechanism and conveyors by the drive of the associated press. Thus, referring to FIG. 4, one of the main press drive gears, in this case the gear 30, is meshed with a power takeoff pinion 80 secured to a horizontally extending power takeoff 81. For driving the first transfer mechanism 41, the power takeoff shaft is coupled via beveled gears 82, 83, respectively.

For direct coupling to the drive of the conveyor 60, a bevel gear 85 is provided, meshing with the bevel gear 82 and having a horizontal shaft 87 which is coupled, via a pair of bevel gears 88, 89 to a vertical conveyor driving shaft 90. At its lower end the latter carries a worm gear 91, meshing with a worm wheel 92, powering a horizontal conveyor drive shaft 93. For producing intermittent or indexed movement of the conveyor to provide a dwell period of the workpiece at the point of pickup by the gripper on the transfer arm, an intermittent drive unit indicated generally at 95 of the roller-drive control-acceleration type is used. As set forth in FIG. 4, the unit includes first and second cams 96, 96 having three-legged cam followers 98, 99 with rollers mounted at the ends of the legs. The cam followers are secured to an output shaft 100. In operation, each time one of the cam members rotates it advances the associated cam follower through an arc of movement which, in the present instance, is $\frac{1}{12}$ of the revolution of the output shaft. Since two cams and cam followers are employed in offset phase relation, the output shaft 100 is advanced in increments with a net stepped down ratio of 6:1. The cams are profiled to produce a dwell period of approximately 50%, i.e., equal to the period during which advancement takes place. For the purpose of which will become more apparent as the discussion proceeds, it will be assumed that the intermittent transmission is so indexed that it will provide an advance of workpieces during 180 degrees rotation and dwell during the remaining 180 degrees of rotation. To transmit this intermittent motion of the conveyor chains, an output gear 102 is secured to the shaft 100 and meshes with a drive pinion 103 on conveyor sprocket shaft 70. The overall ratio is such that the conveyor chains 72, 73 advance a distance $d$ (FIG. 1) for each advance of the intermittent drive mechanism 95.

Figure 4:
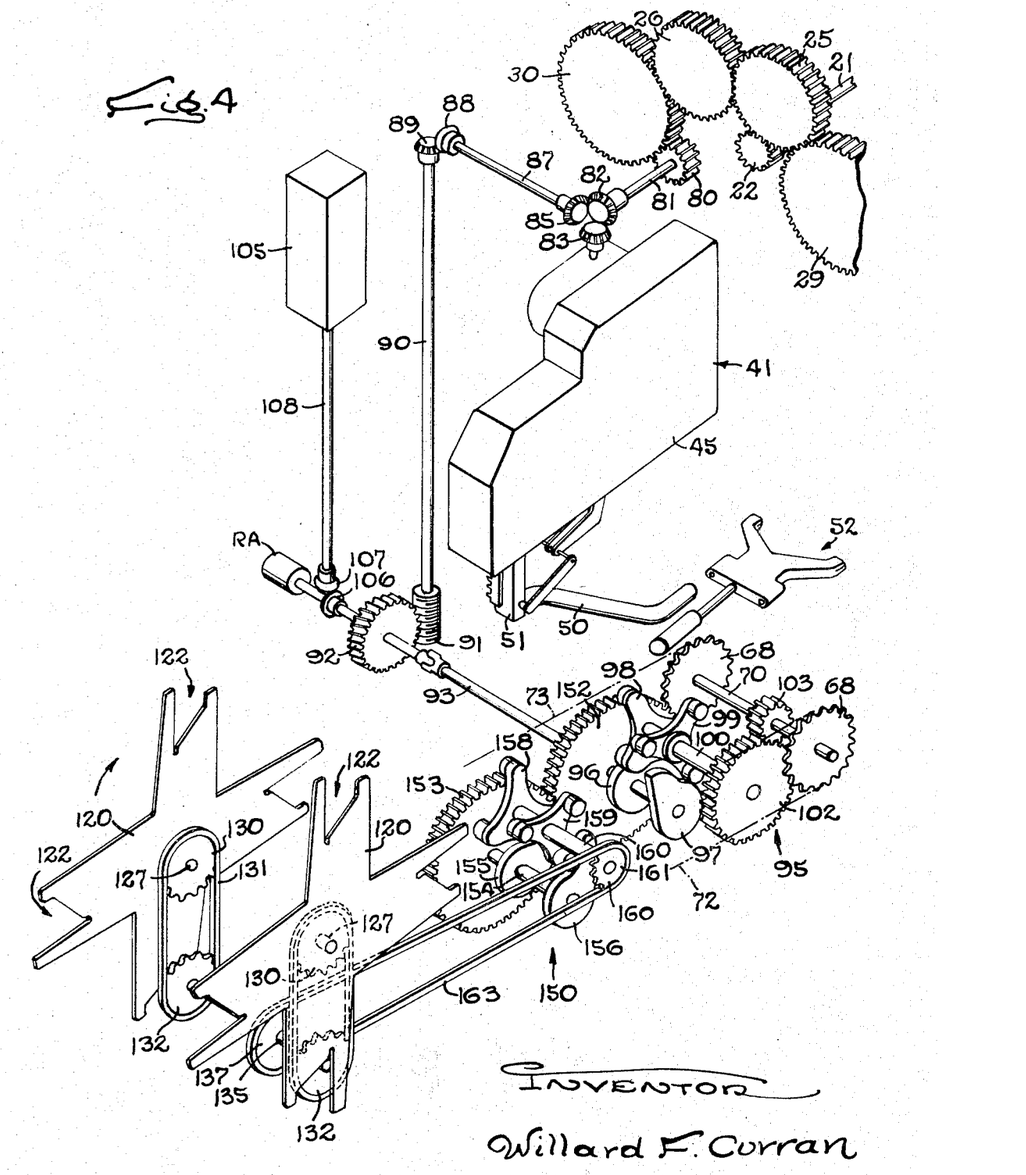
FIG. 4 is a diagrammatic perspective view of the driving mechanism of one press in the line.

Also shown in FIG. 4 are the elements sensitive to the press phase position, namely, the timing cam assembly shown diagrammatically at 105, which may correspond to timing cams used for interlock purposes in a regular power press, and synchro RA used to energize the control circuit for which reference is made to copending application, Ser. No. 413,547, filed Nov. 24, 1964, now U.S. Patent No. 3,199,439. The timing cam assembly is driven via bevel gears 106, 107, which rotate a vertical shaft 108.

Each of the conveyors is provided with a plural set of workpiece holders or fixtures 110 interspersed with one another at incremental positions along the conveyor in order to bring a select set of work holders into active indexed position. The work holders 110 are spaced at the incremental distance $d$ which is equal to the conveyor chain advance for each step of advance of the intermittent drive mechanism previously described.

In carrying out one of the important aspects of the present invention, provision is made for removing the workpiece from its conveyor fixture, inverting the workpiece and replacing it in the fixture from which it was taken, synchronized with the indexed movement of the conveyor fixtures. To accomplish this, positioned along the press conveyors and between adjacent work stations, are a pair of spaced transfer wheels 120, each having arms 121 terminating in jaws 122 dimensioned to receive the workpiece W. In the present instance, four such arms equally spaced are provided so that two of the arms are substantially parallel to the conveyors and two arms are substantially perpendicular to the conveyors with 90 degree indexing movement of the wheels 120. Each of the arms has a length from jaw to jaw of approximately the distance $d$ which the conveyors advance intermittently.

Figures 2, 3:
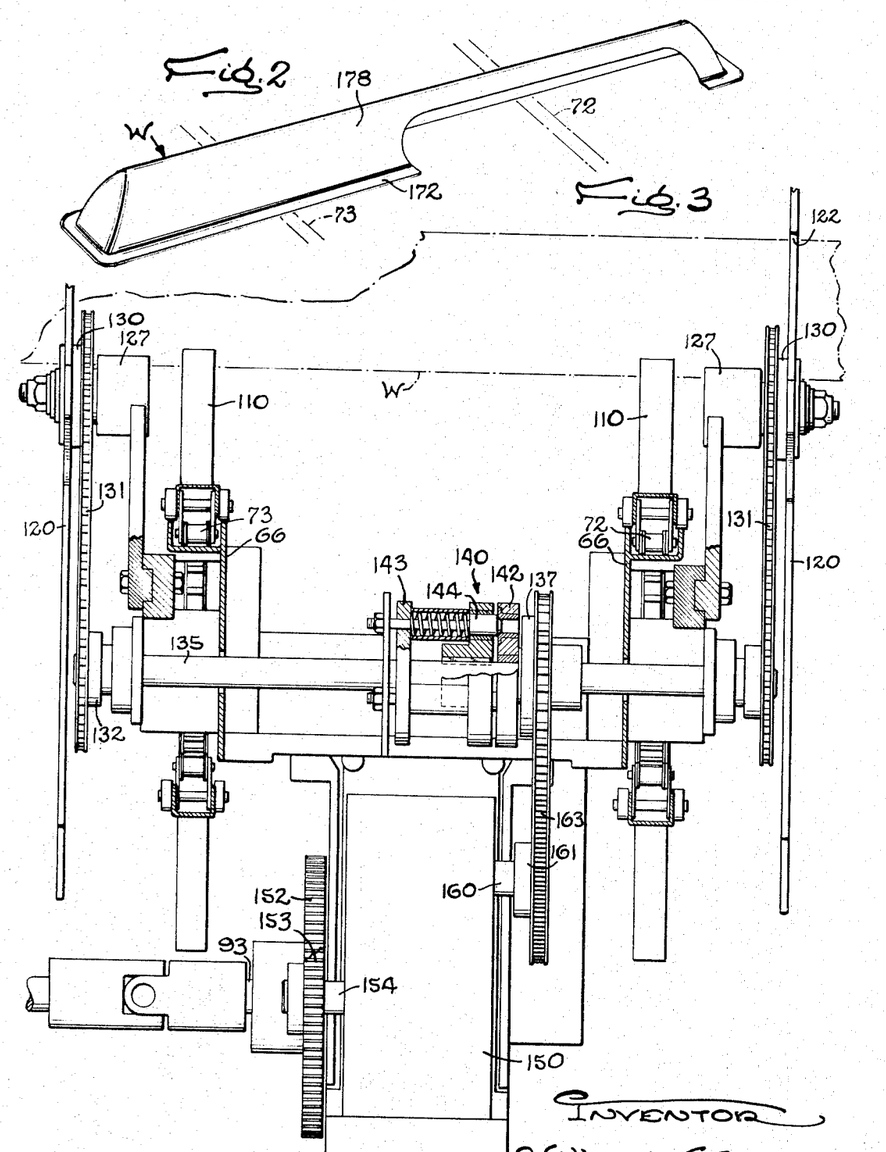
FIG. 2 is a perspective view of a workpiece, in this instance being an automobile instrument panel, the trailing side being shown.
FIG. 3 is a view taken along the line 3—3 in FIG. 1, showing the trunnion supports for the inversion transfer wheels, overload clutch, and drive to the transfer wheels.

In order to enable the wheels 120 to handle workpieces having substantial length and fed broadwise along the conveyors, the wheels are spaced outboard of the conveyors support frame 66, as best shown in FIG. 3. The wheels 120 are mounted on trunnion supports 127, bolted or otherwise fixed to the conveyor support frame. For the purpose of rotatably driving the wheels 120, there is provided a first set of sprockets 130, coupled to the wheels and sprocket chains 131 trained about sprocket wheels 132 journaled to the ends of a shaft 135 supported by the conveyor frame 66.

In order to drive the shaft 135 to rotate the wheels 120 via the associated chain and sprocket arrangement, a sprocket 137 loosely mounted coaxially with shaft 135 is coupled to the shaft via an overload clutch 140. As here shown, the overload clutch 140 includes an apertured disc 142 coupled to the sprocket 137 and also loosely held about the shaft 135. A second annular member 143 is fixed to the shaft 135 and has a plurality of spring biased pins 144 which seat in the apertures of the disc 142 and frictionally couple the disc 142 and its associated sprocket 137 to the member 143. Thus, when excessive torque occurs under loads on the driving sprocket 137 or from an overload on the wheels 120, the disc 142 will break loose from the pins 144 to avoid any damage to the drive mechanism.

In accordance with another of the aspects of the invention, means are provided for producing intermittent or indexed movement of the wheels 120 coordinated with the press line conveyors for removing the workpiece W from a conveyor fixture during dwell of the conveyor at the point of pickup, shifting the wheels to a storage position so that the workpiece is clear of the conveyor, advancing the conveyor fixture into a receiving position and shifting the wheels for depositing the workpiece in the fixture from which it was taken in an inverted position during a subsequent dwell of the conveyor.

For producing intermittent or indexed movement of the wheels 120, an intermittent drive unit 150 (FIG. 4), which in the present exemplary form of the invention is of the roller-drive controlled-acceleration type, is used. The drive unit 150 is operated by conveyor drive shaft 93, via gear 152 coupled to shaft 93 and meshing with gear 153 which turns a shaft 154 having first and second cams 155, 156 mounted thereon. Three-legged cam followers 158, 159, with rollers mounted at the ends of the legs, are secured to an output shaft 160, having a sprocket 161 coupled thereto. The sprocket 161 drives a chain 163, which is trained about the sprocket 137 of the turnover wheel driving shaft 135. In operation, each time one of the cam members rotates it advances the associated cam follower through an arc of movement which, in the present instance, is $\frac{1}{12}$ of the revolution of the output shaft 160. Since two cams and cam followers are employed in offset phase relation, the output shaft 160 is advanced in increments of a net step-down ratio of 6:1. The cams are profiled to produce a dwell period of approximately 50%, i.e., equal to the period during which advancement takes place. The overall ratio is such that the transfer wheel intermittent drive mechanism 150 has two increments of advance equal to a single increment of advance of the conveyor intermittent drive mechanism 95. Moreover, the two intermittent drive mechanisms are synchronized so that each operates during the dwell period of the other.

Figure 7:
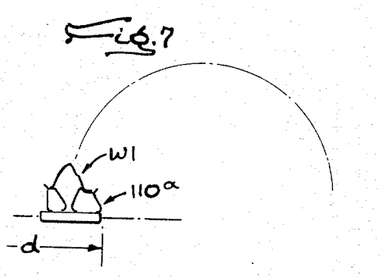
FIGS. 7, 8, 9 and 10 are a set of timing diagrams for the apparatus of FIG. 1 showing the coordination of the conveyor fixture and work turnover wheel at the respective positions in a press cycle.
Figure 8:
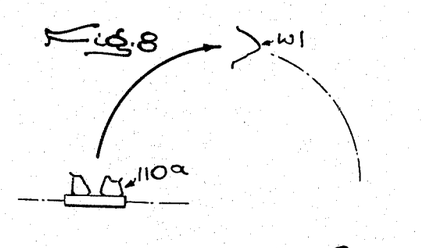
Figure 9:
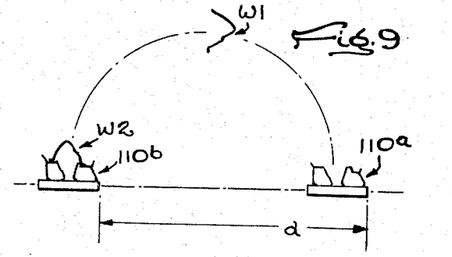
Figure 10:
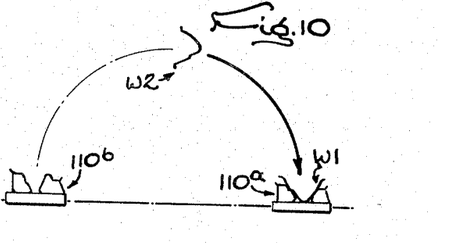

In order to more fully understand the mode of operation of the exemplary turnover apparatus, reference is now made to FIG. 7 wherein a timing diagram showing the coordination of the conveyor fixture and work turnover wheel is shown in the "start" position or point of pickup position. The conveyor fixture 110a advances the distance $d$ into the position wherein the workpiece W1 is positioned in a jaw 122 of one of the arms of the turnover wheel. The conveyor via its intermittent drive mechanism begins a dwell period and the turnover wheel begins its period of advancement rotating, as herein shown in FIG. 8, 90 degrees to a by-pass or storage postion so that the workpiece W1 is clear of the conveyor and the turnover wheel intermittent drive mechanism begins its dwell period. The conveyor now begins its advance and moves the distance $d$ bringing the fixture 110a into the receiving position shown in FIG. 9. At the same time, the next conveyor fixture 110b carrying workpiece W2 is in position for pickup by the turnover wheel. The conveyor dwell period begins again and the turnover wheel is now rotated a second 90 degrees placing workpiece W1 into fixture 110a in an inverted position, workpiece W2 is shifted to the storage position and the transfer wheel begins its dwell period as shown in FIG. 10. The cycle of operation as described repeats itself for each subsequent workpiece and fixture carried along by the conveyors.

Figure 5:
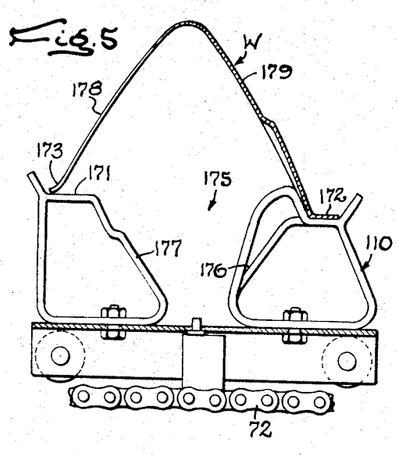
FIG. 5 is a side view of a conveyor fixture showing the workpiece in an upright position.
Figure 6:
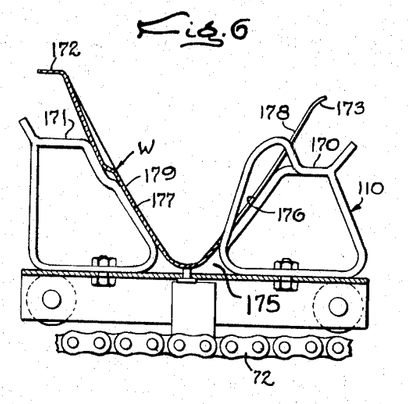
FIG. 6 is a side view of a conveyor fixture showing the workpiece in an inverted position.

In keeping with the present aspect of the invention, the conveyor fixtures 110 are arranged to accommodate the workpiece in both an "upright" and "inverted" position thereby permitting the workpiece W to be removed from the fixture in the upright position and returned to the fixture in an inverted position. To accomplish this, and as best shown in FIGS. 5 and 6, a workpiece W, such as an automotive instrument panel of generally trough shape (FIG. 2) is supported by fixture 110, having upper surfaces 170, 171 dimensioned to carry edges 172, 173 respectively, of workpiece W. In order to support workpiece W in an inverted position, fixture 110 is provided with a generally trough shaped cavity 175 having surfaces 176, 177 dimensioned to receive external surfaces 178, 179, respectively, of workpiece W.

Figure 11:
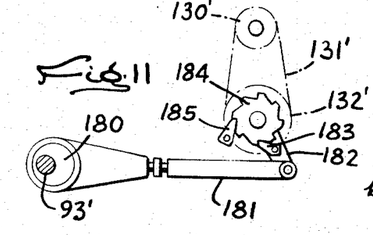
FIG. 11 is a modified form of a turnover wheel driving device also embodying the features of the present invention.

Turning now to FIG. 11, there is shown a modified intermittent drive mechanism for the turnover wheels 120. In the exemplary drive shown in FIG. 11, the input shaft 93' drives an eccentric 180 connected to a link 181 which rocks arm 182 carrying a pawl 183. The pawl advances a ratchet wheel 184 fixed to the shaft carrying sprockets 132'. Chain 120' trained about sprocket 132' and sprocket 130' drives the turnover wheels 120. The eccentric is timed so that the return stroke occurs during the indexed advance of the conveyor intermittent drive substantially in the same sequence of operation as described above for the intermittent drive unit 150.

Figures 12, 13, 14:
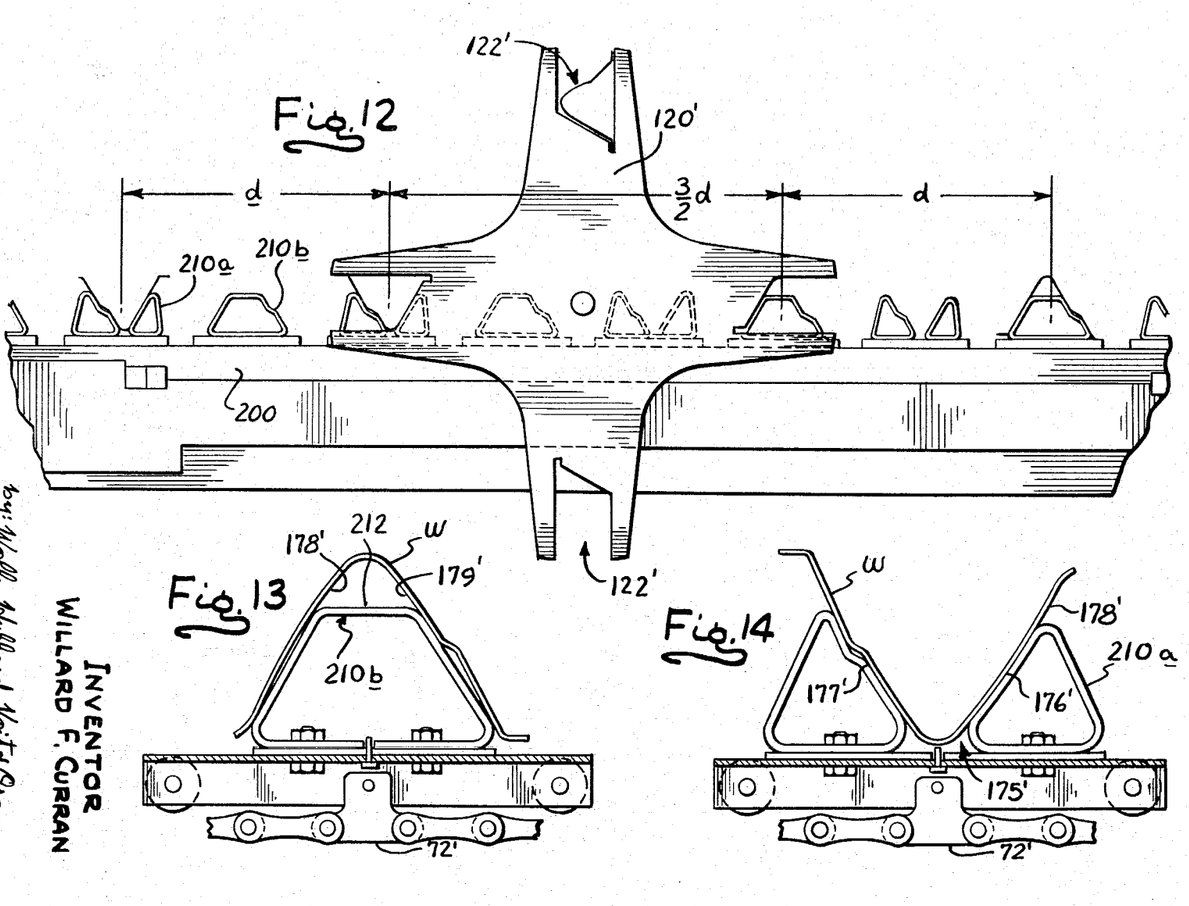
FIG. 12 is a fragmentary, and partially diagrammatic view, of an exemplary turnover apparatus similar to that in FIG. 1, but here depicting a slightly modified turnover system also embodying the features of the present invention.
FIG. 13 is a side view of an exemplary conveyor fixture used in conjunction with the turnover apparatus shown in FIG. 12, here illustrating the workpiece in an upright position.
FIG. 14 is a side view of an exemplary conveyor fixture similar to FIG. 6 and used in conjunction with the apparatus shown in FIG. 12, here illustrating the workpiece in an inverted position.

Turning now to FIG. 12 there is shown a slightly modified workpiece turnover system which is quite similar in construction and operation to that shown in FIG. 1, and also embodies certain of the features of the apparatus shown in FIG. 1. However, in the exemplary apparatus shown in FIG. 12, a workpiece is removed from its conveyor fixture, inverted and placed in an alternate fixture, synchronized with the indexed movement of the conveyor fixtures.

In carrying out this form of the invention, conveyor 200 is provided with plural sets of workpiece holders or fixtures 210a, 210b interspersed with one another at incremental positions along the conveyor in order to bring a select set of workholders into active indexed position. The workholders 210a are spaced at the incremental distance $d$ which is equal to the conveyor chain advance for each step of advance of the intermittent drive mechanism previously described herein. Likewise, the workholders 210b are spaced at the incremental distance $d$, but alternating with workholders 210a such that the distance between respective workholders 210a and 210b is approximately $d/2$.

In order to accommodate the workpiece in "upright" and "inverted" positions, referring to FIGS. 13 and 14 conjointly, a workpiece W, such as the automotive instrument panel of generally trough shape (FIG. 2), is supported by fixtures 210b, having a generally dome shaped surface 212 dimensioned to carry internal surfaces 178', 179' of workpiece W. In order to support workpieces W in inverted positions fixture 210a is provided with a generally trough shaped cavity 175' with surfaces 176', 177' dimensioned to receive external surfaces 178', 179' respectively, of workpiece W.

In the present instance, referring to FIG. 12, transfer wheels 120' as previously described, each have arms 121' terminating in jaws 122' dimensioned to receive the workpiece W, however each of the arms as shown in FIG. 12 has a length from jaw to jaw of approximately $3/2d$, where $d$ is the distance which the conveyors advance intermittently. It will, however, be understood that the above arm length dimension is given only by way of example and may, for the arrangement shown be $5/2d$, $7/2d$, $9/2d$ and so on as space and practicality permit. Thus, it can be seen that the arm length from jaw to jaw is expressed in terms of number of incremental distances $d$ between the jaws for either depositing an inverted workpiece in the fixture from which it was removed as shown in FIG. 1 or depositing the inverted workpiece in alternate fixtures as shown in FIG. 12. Moreover, as the discussion proceeds, it will be apparent that the indexing movement $d$ of the conveyor can be varied for a given arm jaw to jaw length to pickup and deposit inverted workpieces in alternate fixtures.

Figure 15:
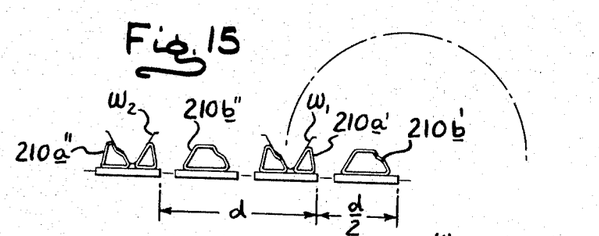
FIGS. 15, 16, 17 and 18 are a set of timing diagrams showing the coordination of the conveyor fixture and work turnover wheel for the exemplary apparatus shown in FIG. 12.
Figure 16:
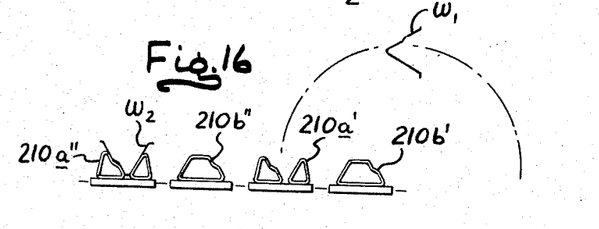
Figure 17:
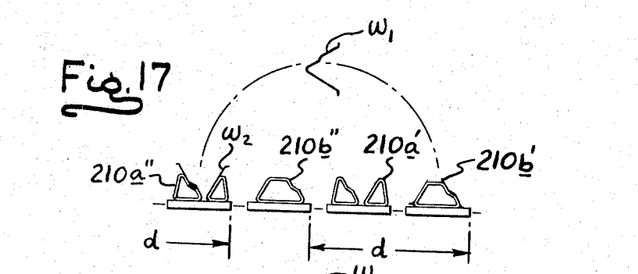
Figure 18:
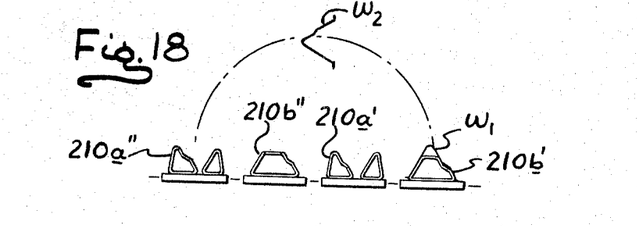

In order to more fully understand the mode of operation of the present form of the invention, reference is made to FIG. 15 wherein a timing diagram showing the coordination of the conveyor fixtures and turnover wheels is shown in the "start" position for a typical cycle of operation. The conveyor fixture 210a' carrying workpiece W1 advances the distance $d$ into the position wherein workpiece W1 is positioned in a jaw of one of the turnover wheel arms, and the conveyor begins a dwell period. The turnover wheel begins its period of advancement rotating, as shown in FIG. 16, 90 degrees to a by-pass or storage position so that the workpiece W1 is clear of the conveyor and its dwell period begins. Conveyor 200 now begins its advance and moves the distance $d$ simultaneously bringing fixture 210b' into the receiving position and fixture 210a'' carrying workpiece W2 in position for pickup of the latter by the turnover which is shown in FIG. 17. Fixture 210b'' is spaced from the receiving position by the distance $d$ in readiness for the ensuing cycle. During the conveyor dwell period now occurring, the turnover wheel is rotated a second 90 degrees placing workpiece W1 into fixture 210b' in an inverted position, workpiece W2 is shifted to the storage position and the transfer wheel begins its dwell period as shown in FIG. 18. This cycle of operation repeats itself for each subsequent workpiece carrying fixture along the conveyor.

It will be apparent to one skilled in the art that a number of the above turnover devices may be employed in a press line to return the workpiece to its original orientation after the workpiece has been operated upon or to invert the workpiece as many times as may be necessary in the press line. Moreover, while the invention has been discussed in connection with automation of a line of power presses, it will be apparent that the invention in its broader aspects may be applied with equal benefit to other specific production lines, and, consequently, the terms "press line" and "press" may be broadly construed to include analogous means for performing successive operations on a workpiece.

In the following claims reference to "synchronous driving" or "synchronous movement" will be understood to refer to movement which is precisely timed to produce the sequential interaction which has been discussed and the terms are not intended to imply "in phase". The term "work area" denotes the area under the slide and in which the workpiece is operated upon.

It will be apparent also that the term "turnover wheel" is not limited to the particular wheels shown and any means capable of providing pickup, inversion and return of a workpiece to the fixture from which it was removed or in alternate fixtures in accordance with the sequential interactions which have been discussed may be used without deviating from the present invention. Also the term "fixture" is intended to include any support having a configuration adapted to hold a particular workpiece in both an upright and inverted position.

I claim as my invention:

1. In a press line for performing a series of press operations on a workpiece, the combination comprising a series of power presses each having an individual press drive and working area, conveyors extending between the working area of adjacent presses, transfer mechanisms at the output and input sides of said adjacent presses for transferring workpieces to and from the conveyors, said transfer mechanisms being coupled to respective press drives for precisely coordinated movement with respect to the press slide, intermittent drive means coupled to a press drive of one of its adjacent presses for driving each of said conveyors through equal periods of advance and dwell, a plurality of fixtures spaced along the conveyors, turnover means positioned along at least one of said press conveyors and between adjacent work stations, means including an intermitent drive coupled to said conveyor intermittent drive means for driving said turnover means through equal periods of advance and dwell, said turnover intermittent drive means being synchronized with said conveyor intermittent drive means so that each of said conveyors and turnover means advances during the dwell period of the other.

2. A press line in accordance with claim 1 where said fixtures are spaced at distances equal to the advance of said conveyors.

3. A press line in accordance with claim 2 wherein said turnover means period of advance is one-half said conveyor period of advance.

4. In a press line for performing a series of press operations on a workpiece, the combination comprising a series of power presses each having an individual press drive and working area, conveyors extending between the working areas of adjacent presses, transfer mechanisms at the output and input sides of said adjacent presses for transferring workpieces to and from the conveyors, said transfer mechanisms being coupled to respective press drives for precisely coordinated movement with respect to the press slide, intermittent drive means coupled to a press drive of one of its adjacent presses for driving said conveyors through periods of advance and dwell, a plurality of fixtures spaced along at least one of the conveyors at distances equal to the advance of said conveyor, a pair of coaxially spaced turnover wheels positioned along said conveyor between adjacent work stations, said wheels having arms of length approximately equal to the distance of advance of said conveyor fixtures, each of said arms having jaws for receiving a workpiece and means including an intermittent drive coupled to said conveyor intermittent drive means for driving said wheels through periods of advance and dwell, said turnover wheels intermittent drive means being synchronized with said conveyor intermittent drive means for advancing said turnover wheels through two periods of advance equal to a single period of advance of said conveyor, so that a first fixture advances to a pickup position and dwells, said turnover wheels advance to a storage position and dwell, said first fixture advances to a receiving position and dwells and thereafter said turnover wheels advance to deposit an inverted workpiece in said first fixture.

5. A press line in accordance with claim 4, wherein said fixtures are adapted to receive workpieces in upright or inverted positions.

6. In a press line for performing a series of press operations on a workpiece, the combination comprising a series of power presses, each having an individual press drive and working area, horizontal conveyors extending between the working areas of adjacent presses, transfer mechanisms at the output and input sides of said adjacent presses for transferring workpieces to and from the conveyors, said transfer mechanisms being coupled to respective press drives for precisely coordinated movement with respect to the press slide, intermittent drive means coupled to a press drive of one of its adjacent presses, for driving at least one of said conveyors at equal periods of advance and dwell, first and second fixtures carrying first and second workpieces, respectively, spaced along said conveyor at a distance equal to the advance of said conveyor, turnover means positioned along said conveyor and between the adjacent work stations, and means including an intermittent drive coupled to said conveyor intermittent drive for driving said turnover means at equal periods of advance and dwell synchronized with respect to one another so that each of said conveyor and turnover means advances during the dwell period of the other so that when said first conveyor fixture advances into a receiving position with respect to said turnover means and dwells, said turnover means removes said first workpiece and shifts it to a storage position, said first and second fixtures being advanced to receiving and pickup positions, respectively, and thereafter said turnover means simultaneously places the first workpiece into said first fixture in an inverted position and shifts said second workpiece to a storage position.

7. In a press line for performing a series of press operations on a workpiece, the combination comprising a series of power presses, each having an individual press drive and working area, conveyors extending between the working areas of adjacent presses, transfer mechanisms at the output and input sides of said adjacent presses for transferring workpieces to and from the conveyors, said transfer mechanisms being coupled to respective press drives for precisely coordinated movement with respect to the press slide, intermittent drive means coupled to a press drive of one of its adjacent presses for driving said conveyors through periods of advance and dwell, a plurality of fixtures spaced along at least one of the conveyors at distances equal to the advance of said conveyor, turnover means positioned along said conveyor between adjacent work stations, said turnover means having at least one arm of a length approximately one-half the distance of advance of said conveyor fixtures and rotatable about an axis substantially level with said fixtures, said arm having a jaw for receiving a workpiece, means including an intermittent drive coupled to said conveyor intermittent drive means for driving said arm through periods of advance and dwell, said turnover means intermittent drive being synchronized with said conveyor intermittent drive means for rotating said arm through two periods of advance equal to a single period of advance of said conveyor so that a first fixture advances a first workpiece into said jaw opening in a direction opposite to the direction of conveyor movement and dwells, said arm rotates to a storage position and dwells, said first fixture advances to a receiving position and dwells and thereafter said arm rotates to deposit an inverted workpiece in first said fixture with said jaw opening in the direction of conveyor movement so that subsequent advance of the conveyor carries said inverted workpiece in said fixture out of the jaw.

8. In a press line for performing a series of press operations on a workpiece, the combination comprising a series of power presses each having an individual press drive and working area, conveyors extending between the working areas of adjacent presses, transfer mechanisms at the output and input sides of said adjacent presses for transferring workpieces to and from the conveyors, said transfer mechanisms being coupled to respective press drives for precisely coordinated movement with respect to the press slide, intermittent drive means coupled to a press drive of one of its adjacent presses for driving said conveyors through periods of advance and dwell, a plurality of fixtures alternately spaced along at least one of the conveyors at distances equal to the advance of said conveyor, a pair of coaxially spaced turnover wheels positioned along said conveyor between adjacent work stations, said wheels having arms of length which is a function of the distance of advance of said conveyor fixtures, each of said arms having jaws for receiving a workpiece and means including an intermittent drive coupled to said conveyor intermittent drive means for driving said wheels through periods of advance and dwell, said turnover wheels intermittent drive means being synchronized with said conveyor intermittent drive means for advancing said turnover wheels through two periods of advance equal to a single period of advance of said conveyor with each of said conveyer and turnover wheels advances occuring during the dwell period of the other, so that a first fixture advances to a pickup position and dwells, said turnover wheels advance to a storage position and dwell, said conveyor advances a second fixture to a receiving position and dwells, and thereafter said turnover wheels advance to deposit an inverted workpiece in said second fixture.

9. In a press line for performing a series of press operations on a workpiece, the combination comprising a series of power presses, each having an individual press drive and working area, conveyors extending between the working areas of adjacent presses, transfer mechanisms at the output and input sides of said adjacent presses for transferring workpieces to and from the conveyors, said transfer mechanisms being coupled to respective press drives for precisely coordinated movement with respect to the press slide, intermittent drive means coupled to a press drive of one of its adjacent presses for driving said conveyors through periods of advance and dwell, a plurality of fixtures spaced along at least one of the conveyors, turnover means positioned along said conveyor between adjacent work stations, said turnover means having at least one arm rotatable about an axis substantially level with said fixtures, said arm having a jaw for receiving a workpiece, means including an intermittent drive coupled to said conveyor intermittent drive means for driving said arm through periods of advance and dwell, said turnover means intermittent drive being synchronized with said conveyor intermittent drive means for rotating said arm through two periods of advance equal to a single period of advance of said conveyor so that a first fixture advances a first workpiece into said jaw opening in a direction opposite to the direction of conveyor movement and dwells, said arm rotates to a storage position and dwells, a second fixture advances to a receiving position and dwells and thereafter said arm rotates to deposit an inverted workpiece in said second fixture with said jaw opening in the direction of conveyor movement so that subsequent advance of the conveyor carries said inverted workpiece in said second fixture out of the jaw.

References Cited
UNITED STATES PATENTS

| | | |
|---|---|---|
| 1,170,913 | 2/1916 | Kraemer. |
| 1,217,923 | 3/1917 | Donnelly. |
| 1,594,326 | 7/1926 | Richter. |
| 2,461,167 | 2/1949 | Malhiot ____________ 198—33 |
| 2,937,553 | 5/1960 | Sherman _________ 198—221 X |

EVON C. BLUNK, *Primary Examiner.*

R. J. HICKEY, *Assistant Examiner.*